Taylor & Burger,
Wood Auger.

N° 25,289. Patented Aug. 30, 1859.

Witnesses:
C. E. Burr
S. R. Taylor

Inventors:
George Taylor
George D. Burger

UNITED STATES PATENT OFFICE.

GEO. TAYLOR AND GEO. H. BURGER, OF WORTHINGTON, OHIO.

AUGER FOR CUTTING ROUND TENONS.

Specification of Letters Patent No. 25,289, dated August 30, 1859.

*To all whom it may concern:*

Be it known that we, GEORGE TAYLOR and G. H. BURGER, both of Worthington, in the county of Franklin and State of Ohio, have invented a new and Improved Spring-Auger; and we do hereby declare that the following is a full, clear, and exact description of the same, reference being had to the accompanying drawing, forming a part of this specification, in which,—

Figure 2:
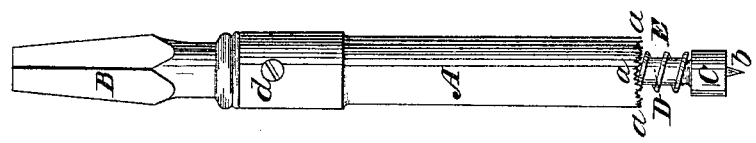
Figure 1:
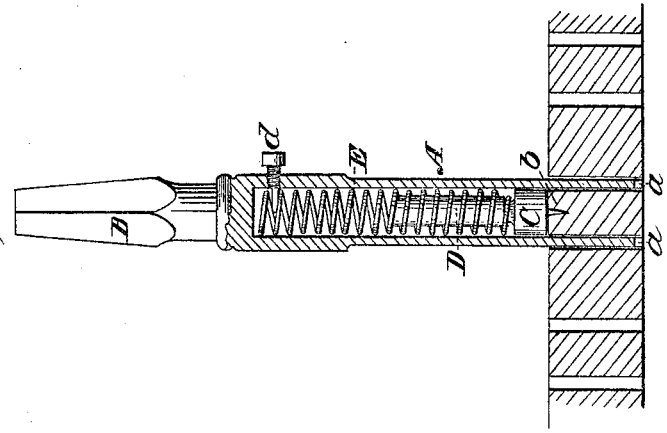

Figure 1 represents a longitudinal vertical central section of our invention. Fig. 2 is an elevation of the same.

Similar letters of reference in both figures indicate corresponding parts.

To enable those skilled in the art to make and use our invention we will proceed to describe its construction and operation.

A represents a tube turned off perfectly cylindrical and of uniform thickness, made of steel or having a piece of steel welded to its lower edge, which is squared off and provided with a series of saw teeth, a, and hardened so as to form a perfect cutting edge. Attached to the upper end of this tube is a square head B, which fits into a common drill stock or breast brace, or into a tenoning or boring machine. Fitted into the inside of this tube is a cylindrical plug, C, which is provided with a central point, b, and the upper end of which is turned down so as to form a shank, D, which extends up into the tube where it serves as a guide for a spiral spring, E, the lower end of which is secured in a groove, c, turned into the lower or outer end of the shank, D, and the upper end of this spring is retained by means of a screw, d, which screws into the upper part of the tube, A, as clearly represented in Fig. 1, and this part of the tube is left thicker so as to give sufficient hold to the screw, d, it being injudicious to make the lower part of the tube, A, much thicker than represented in Fig. 1, of the drawing, even for larger augers, for it is principally the thickness of this tube on which it depends what power is necessary to operate this auger, and it will be easily understood how a tube with thicker walls having to remove a so much larger quantity of wood will necessarily work much harder.

In order to cut out tenons with our auger, it is necessary to cut that portion of the wood, which is to be formed into tenons just thick enough for the diameter of the same. The centers of the tenons being well marked, the auger is placed into a drill-stock, or brace, and the point, b, being inserted into one of the centers the tube is rotated by means of its square head, B, and sufficient power is brought to bear on the auger to cause the saw teeth, a, to cut into the wood. And as the width of the wood is equal to the inside diameter of the tube, A, an open space is formed through which the saw-dust escapes. As the tube descends deeper and deeper into the wood, the plug, C, recedes, forming all the while a perfect guide for the tube so that the latter cannot enter the wood otherwise than straight, and afer having commenced straight, that part of the tenon which is finished assists in guiding the tube during the rest of the operation. After a sufficient number of tenons has been cut, the wood remaining between them is removed and nothing remains to be done but to bore holes in the other part of the wood to which the first piece is to be jointed, said holes to be exactly of the same size as the inside of the tube, A, and the two pieces will fit together making a perfectly close joint.

We are aware that the use of a movable centering pin, within an auger is not new, being seen in D. George's patent March 28, 1848. We therefore disclaim the invention of such pin, but

What we claim as new and desire to secure by Letters Patent, is—

The arrangement and combination of the spring E, with the shank D, and tube A substantially as herein shown and described, whereby the plug C, is rendered self-adjusting as set forth.

GEORGE TAYLOR.
GEORGE H. BURGER.

Witnesses.
C. E. BURR,
S. R. TAYLOR.